(12) United States Patent
Nelson (10) Patent No.: US 9,414,538 B1
(45) Date of Patent: Aug. 16, 2016

(54) FERTILIZER PLACEMENT TUBE

(71) Applicant: Larry Nelson, Hartland, MN (US)

(72) Inventor: Larry Nelson, Hartland, MN (US)

(73) Assignee: L & D Ag Service, Inc., Hartland, MN (US)

(*) Notice: Subject to any disclaimer, the term of this patent is extended or adjusted under 35 U.S.C. 154(b) by 0 days.

(21) Appl. No.: 14/613,018

(22) Filed: Feb. 3, 2015

(51) Int. Cl.
*A01C 23/02* (2006.01)
*A01C 7/06* (2006.01)
*A01B 49/06* (2006.01)

(52) U.S. Cl.
CPC ............... *A01C 23/025* (2013.01); *A01B 49/06* (2013.01); *A01C 7/06* (2013.01)

(58) Field of Classification Search
CPC ............ A01C 5/08; A01C 7/04; A01C 15/00; A01C 21/00; A01C 23/025; A01C 7/06; A01B 49/06
USPC .......................................... 111/120, 123, 164
See application file for complete search history.

(56) References Cited

U.S. PATENT DOCUMENTS

| | | | | |
|---|---|---|---|---|
| 2,843,066 A * | 7/1958 | Dugan | ................. | A01C 23/025 111/119 |
| 3,990,662 A * | 11/1976 | Wallace | ................. | A01B 17/00 248/74.1 |
| 5,271,342 A * | 12/1993 | Neidhardt | ............ | A01C 23/025 111/119 |
| 5,697,308 A * | 12/1997 | Rowlett | ................. | A01C 5/062 111/149 |
| 8,931,423 B2 * | 1/2015 | Wickstrom | ............ | A01B 49/06 111/124 |
| 8,978,564 B2 * | 3/2015 | Hagny | ..................... | A01C 5/06 111/164 |
| 9,192,095 B1 * | 11/2015 | Bergmeier | ........... | A01C 23/025 |

* cited by examiner

*Primary Examiner* — John G Weiss
(74) *Attorney, Agent, or Firm* — G. Brian Pingel; David M. Breiner; Camille L. Urban (57) ABSTRACT

Disclosed is a fertilizer application system that may include a planter implement, a sleeve attached to the planter implement, and a flexible hose extending through at least a portion of the sleeve. In example embodiments the flexible hose may be configured to transport liquid fertilizer from a fertilizer tank to a furrow in a ground created by the planter implement.

18 Claims, 11 Drawing Sheets

FERTILIZER PLACEMENT TUBE

BACKGROUND

1. Field

Example embodiments relate to fertilizer placement tubes and systems that use the fertilizer placement tubes.

2. Description of the Prior Art

Figure 1:
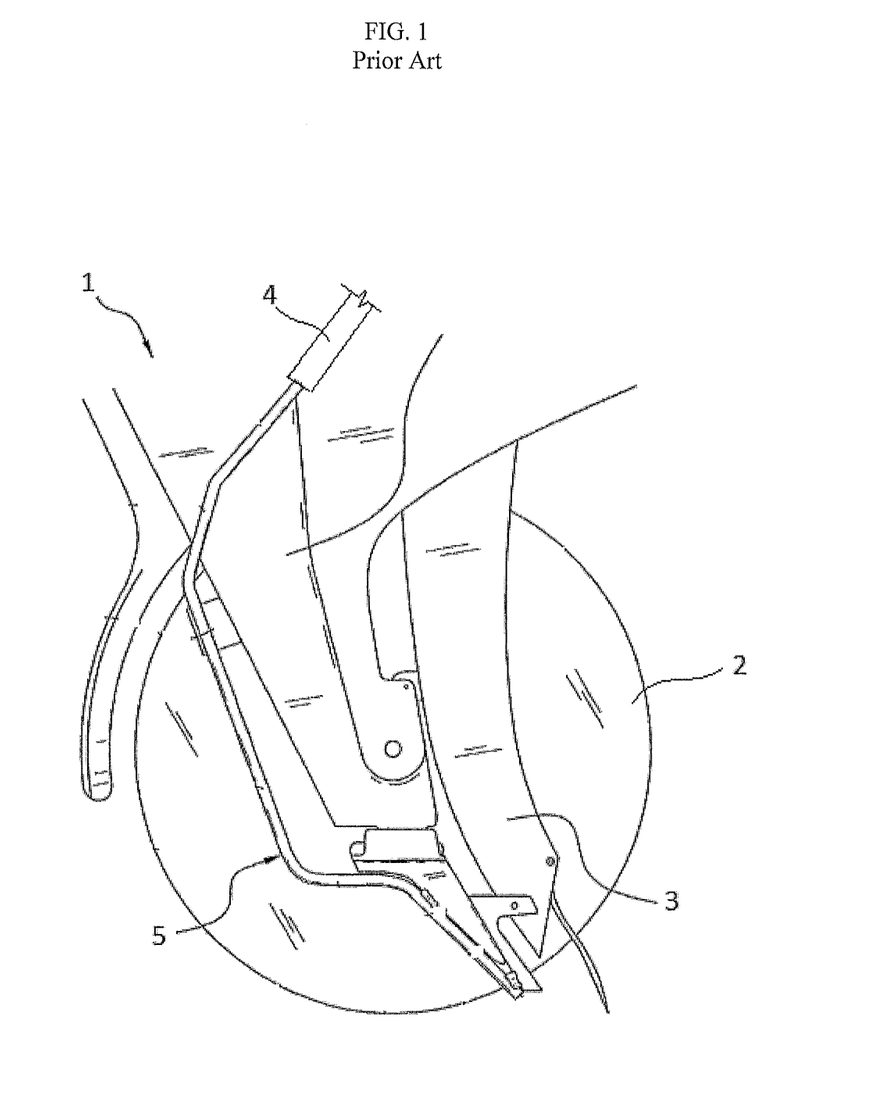
FIG. 1 is a view of a conventional liquid fertilizer application system.

FIG. 1 is a view of a conventional liquid fertilizer application system 1. As shown in FIG. 1, the conventional liquid fertilizer application system 1 includes an implement comprised of a pair of disks 2 (only one of which is shown in FIG. 1), a seed tube 3, and a fertilizer hose 4. Generally speaking, the pair of disks 10 are configured to open a furrow in the ground and the fertilizer tube 4 is configured to deposit fertilizer into the furrow via a fertilizer tube 5 which receives liquid fertilizer from the fertilizer tube 4. After the fertilizer is applied to the furrow a seed is deposited in the furrow which is then covered by soil.

In some conventional liquid fertilizer application systems the fertilizer tube 5 is a rigid tube having several bends. In the conventional art the fertilizer hose 4 is attached at one end of the tube 5 to deliver fertilizer to the tube 5 which then guides the fertilizer to the furrow.

SUMMARY

The inventor has discovered that while conventional liquid fertilizer application systems do a relatively decent job in providing fertilizer to a furrow the connection between the conventional fertilizer hoses and fertilizer tubes are prone to breaking. This often results in fertilizer not being provided to the fertilizer tubes. As a consequence, the inventor has sought to design a new liquid fertilizer application system which does not suffer the aforementioned drawback. As a result, the inventor has developed a novel and nonobvious liquid fertilizer application system.

In accordance with example embodiments, a fertilizer application system may include a planter implement, a sleeve attached to the planter implement, and a flexible hose extending through at least a portion of the sleeve. In example embodiments the flexible hose may be configured to transport liquid fertilizer from a fertilizer tank to a furrow in a ground created by the planter implement.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to fertilizer placement tubes and systems which utilize the tubes.

Figure 2:
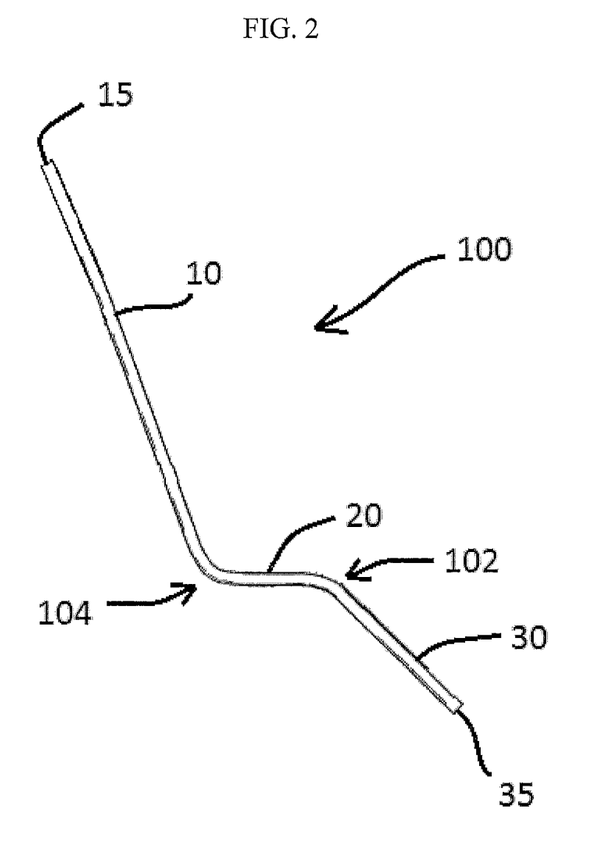
FIG. 2 is a view of a tube in accordance with example embodiments.

FIG. 2 is a view of a tube 100 in accordance with example embodiments. In example embodiments the tube 100 may be a substantially hollow tube and may be used in a fertilizer application system. As will be explained shortly, the tube 100 may serve as a sleeve into which a fertilizer hose may be inserted. As shown in FIG. 2, the tube 100 may include one or more bends. For example, in FIG. 2 the tube 100 is illustrated as having a first bend 102 and a second bend 104 which divide the tube 100 into a first section 10, a second section 20, and a third section 30. In example embodiments, the first, second and third sections 10, 20, and 30 may be, but are not required to be, substantially straight sections. Although the tube 100 of FIG. 2 is illustrated as having two bends this is not intended to limit the invention. For example, the inventive concepts of example embodiments may be embodied in tubes having no bends, a single bend, or more than two bends.

In example embodiments, the tube 100 may be fabricated from readily available materials. For example, in one embodiment, the tube 100 may be fabricated by cutting and bending a conventional stainless steel pipe. For example, a ⅛ inch schedule 40 stainless steel pipe may be cut to a desired length and the cut steel may be bent twice to form the tube 100. For example, in example embodiments, ⅛ inch schedule 40 stainless steel pipe may be cut to have a length of about fifteen inches. The cut pipe may then be bent at about 4 7/16 inches from an end 35 of the tube 100 to form the first bend 102 having an angle of about 30 degrees and then again about 1 ⅞ inches down from the first bend 102 to form the second bend 104 having an angle of about 29 degrees. In example embodiments, each of the first bend 102 and the second bend 104 may have a have a radius of about 1 ⅝ inches.

It is understood the above description is exemplary only and is not intended to limit the invention. For example, the material used for the tube 100 does not necessarily have to be stainless steel. Furthermore, the first bend 102 and the second bend 104 do have to be at the aforementioned positions or have the aforementioned radii. For example, the length of the tube 100 may be fifteen and one quarter inches rather than fifteen inches and the first bend 102 may be located 4 11/16 inches rather than 4 7/16 inches from an end of the tube 100.

Figure 3:
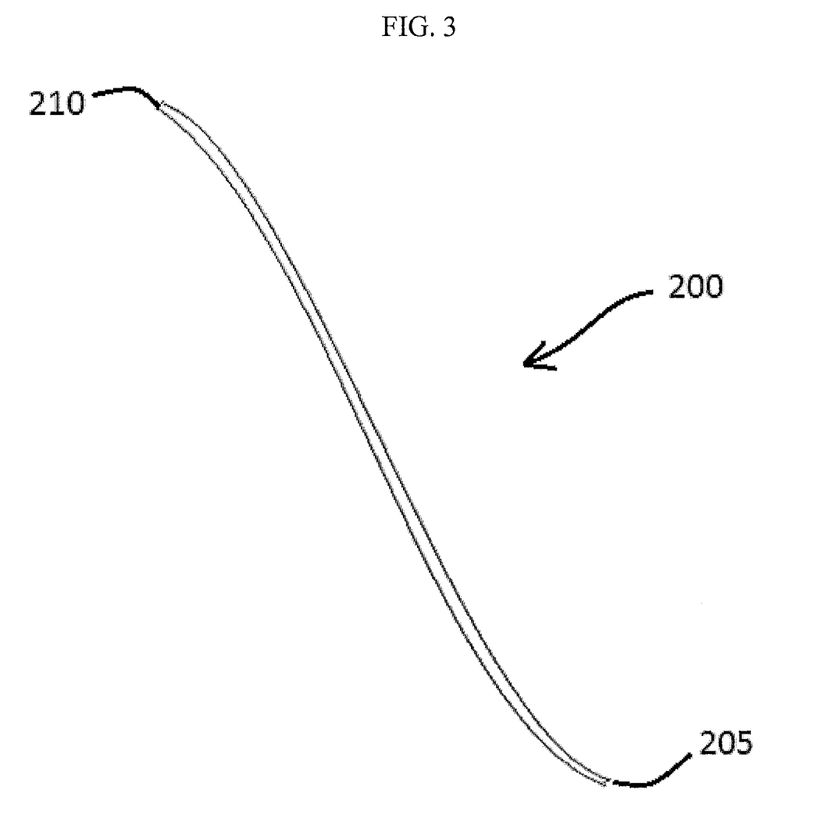
FIG. 3 is a view of a hose in accordance with example embodiments.

FIG. 3 is a view of a hose 200 in accordance with example embodiments. In example embodiments the hose 200 may be a relatively flexible hose and may be configured to transport a liquid fertilizer. For example, in example embodiments, the hose may be formed from ¼" OD LLDPE polyethylene. In example embodiments an outer diameter of the hose 200 may be about the same size or smaller than an inner diameter of the tube 100. Thus, in example embodiments the hose 200 may be inserted into and/or moved within the tube 100.

Figure 4A:
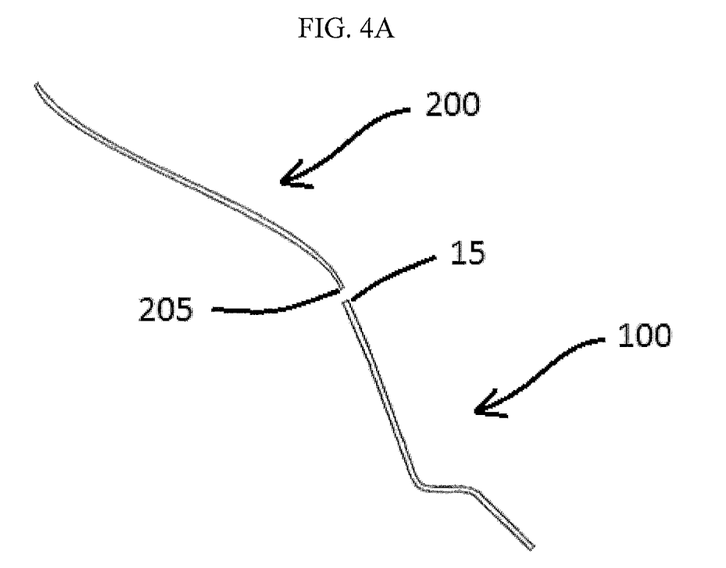
FIGS. 4A-4E illustrate the hose being inserted into the tube in accordance with example embodiments.
Figure 4B:
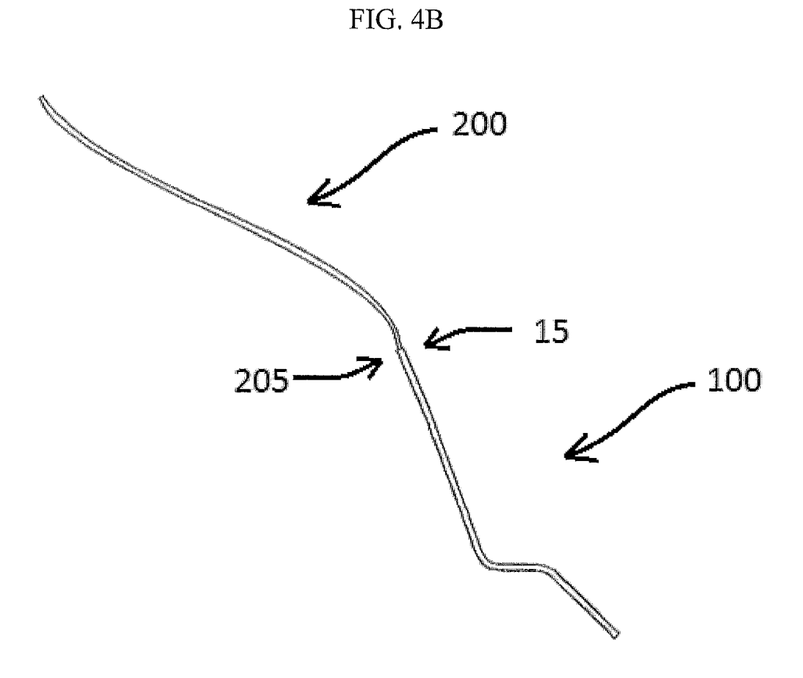
Figure 4C:
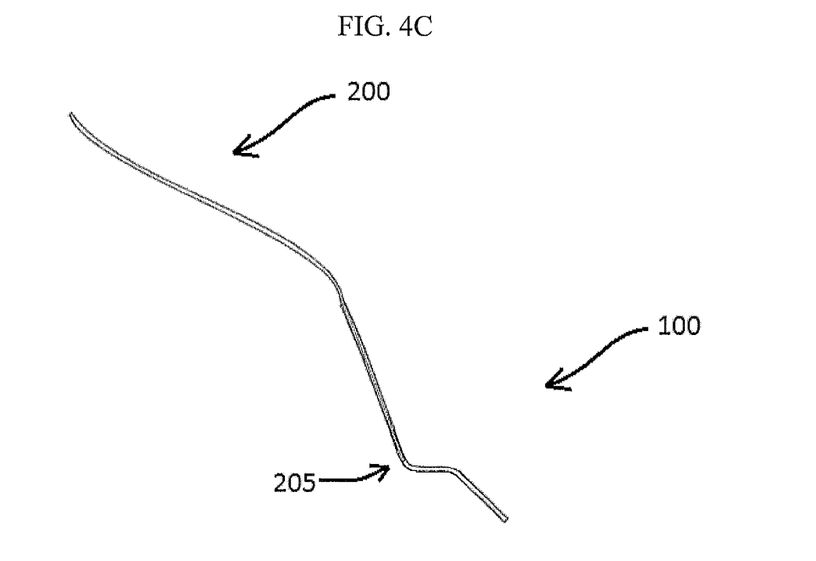
Figure 4D:
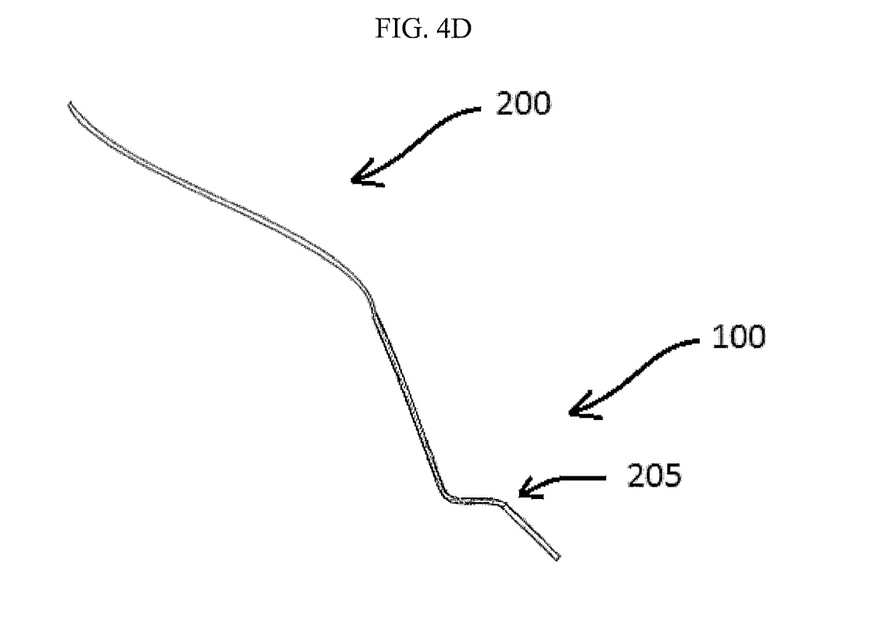
Figure 4E:
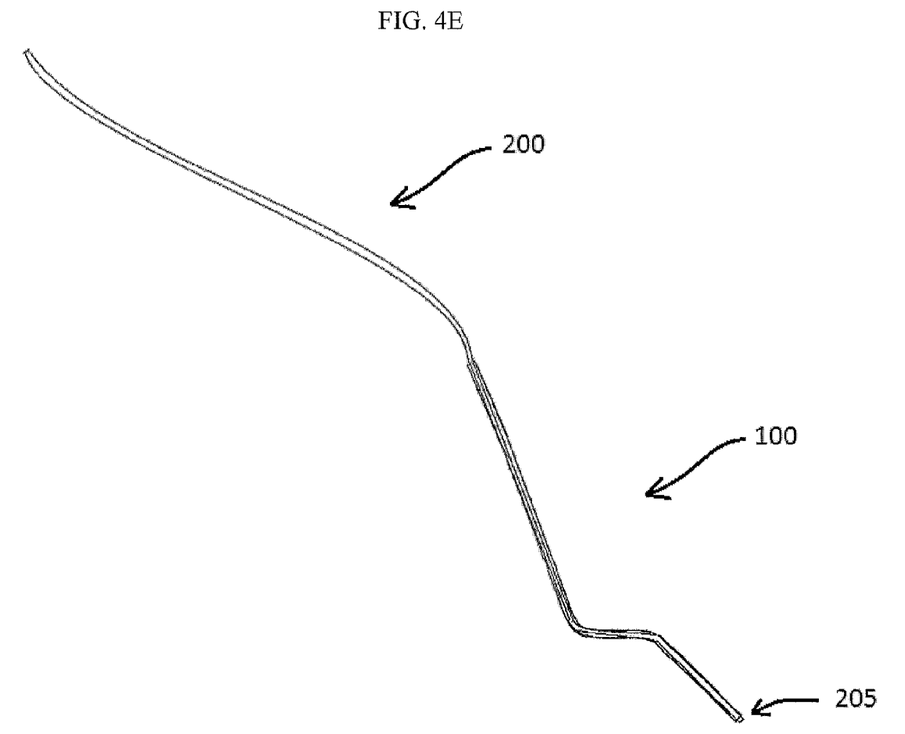

FIGS. 4A-4E illustrate the hose 200 being inserted into the tube 100. For example, in FIG. 4A an end 205 of the hose 200 is arranged near a first end 15 of the tube 100. In FIG. 4B the end 205 of the hose 200 is illustrated as being inserted in the first end 15 of the tube 100. FIG. 4C illustrates the end 205 of the hose 200 being moved through the tube 100 towards the second bend 104. FIG. 4D illustrates the end 205 of the hose 200 being moved through the tube 100 and near the first bend 102. FIG. 4E illustrates the end 205 of the hose protruding out of second end 35 of the tube 100.

In example embodiments, a second end of the hose 210 may be attached to a liquid fertilizer tank, either directly or indirectly. In operation, liquid fertilizer from the liquid fertilizer tank may flow through the hose 200 which is threaded through the tube 100 and may exit the hose 200 via the end 205 of the hose 200.

Figure 5:
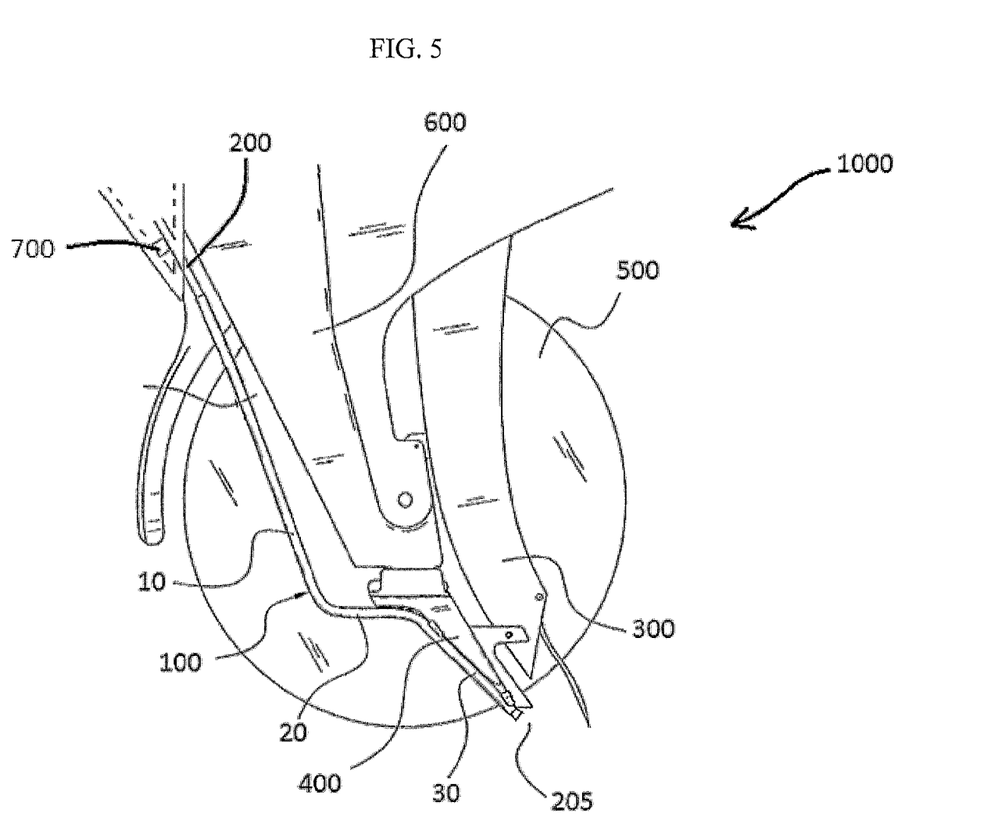
FIG. 5 is a view of an implement in accordance with example embodiments.

FIG. 5 illustrates the tube 100 attached to a planter implement 1000. The planter implement 1000 may be, for example, a John Deere MaxEmerge 5 planter implement 1000, however, the inventive concepts are not limited to using the tube 100 with the John Deere MaxEmerge 5 planter. In the specific example of FIG. 5, the planter implement 1000 is shown as being comprised of a seed tube 300, a seed tube guard 400, at least one disk 500, and a shank 600. In example embodiments, the tube 100 may be attached to planter implement 1000. For example, the tube 100 may be attached to the seed tube guard 400 by a conventional method such as welding, however, the invention is not limited thereto. For example, the tube 100 may be attached to the guard 400 by a different method or device such as, but not limited to, ties, straps, clamps, and/or clips. In this particular non-limiting example, the bends of the tube 100 are particularly well suited for following the contour of the seed tube guard 400. In example embodiments, the hose 200 may be threaded through the tube 100 so the end 205 of the hose 200 protrudes through the tube 100 as shown in FIG. 5. Thus, as fertilizer flows through the tube 200 the fertilizer may flow near the seed tube 300 so that fertilizer may be placed in a furrow which may be created by the at least one disk 500.

In example embodiments, the hose 200 threaded through the tube 100 may be secured to the tube 100 by various means such as, but not limited to ties, tapes, clamps, or an adhesive. Such means may help prevent the hose 200 from slipping when the planter implement 1000 is used to plant seeds. In example embodiments, the hose 200 may additionally (or alternatively) be secured in place by additional means. For example, in FIG. 5 the hose 200 is illustrated as being attached to structural member of the planter implement 1000 with a clamp 700.

Figure 6:
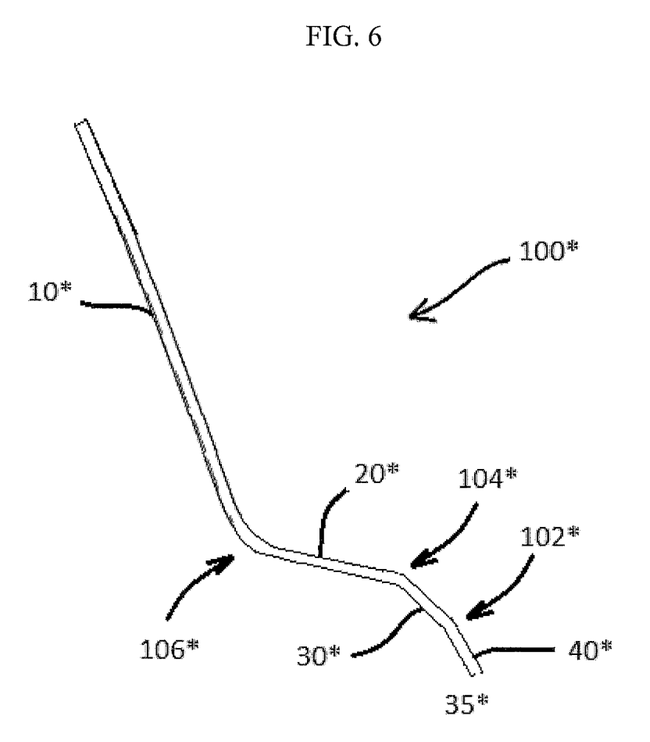
FIG. 6 is another tube in accordance with example embodiments.

As emphasized above, the tube 100 of example embodiments is exemplary only and is not intended to limit the invention. As shown in FIG. 6, another tube 100* in accordance with example embodiments is provided. As in the previous example, the tube 100* may be used to deliver fertilizer and may function as a sleeve for the hose 200. In example embodiments, the tube 100* may include one or more bends. For example, in the particular example illustrated in FIG. 6, the tube 100* is illustrated as having a first bend 102*, a second bend 104*, and a third bend 106* which divide the tube 100* into a first section 10*, a second section 20*, a third section 30*, and a fourth section 40*. In example embodiments, the first, second, third and fourth sections 10*, 20*, 30*, and 40* may be, but are not required to be, substantially straight sections. Although the tube 100* of FIG. 6 is illustrated as having three bends this is not intended to limit the invention. For example, the inventive concepts of example embodiments may be embodied in tubes having less than three bends or more than three bends.

In example embodiments, the tube 100* may also be fabricated from readily available materials. For example, in one embodiment, the tube 100* may be fabricated by cutting and bending a conventional stainless steel pipe. For example, a ⅛ inch schedule 40 stainless steel pipe may be cut to a desired length and the cut steel may be bent three times to form the tube 100*. For example, in example embodiments, ⅛ inch schedule 40 stainless steel pipe may be cut to have a length of about fifteen inches. The cut pipe may then be bent at about 6 ¾ inches from an end 35* to form the first bend 102* having an angle of about 29 degrees, again about 2 ¾ inches down from the first bend 102* to form the second bend 104* having an angle of about 16 degrees, and again about 3 1/16 inches down from the second bend 104* to form the third bend 106* having an angle of about 16 degrees. In example embodiments, each of the first bend 102*, the second bend 104*, and the third bend 106* may have a radius of about 7/8 inches.

As in the previous example, the hose 200 may be inserted into the tube 100*. For example, the hose 200 may be inserted along a length of the tube 100* so that an end 205 there of protrudes out of an end of the tube 100* as in the previous example.

Figure 7:
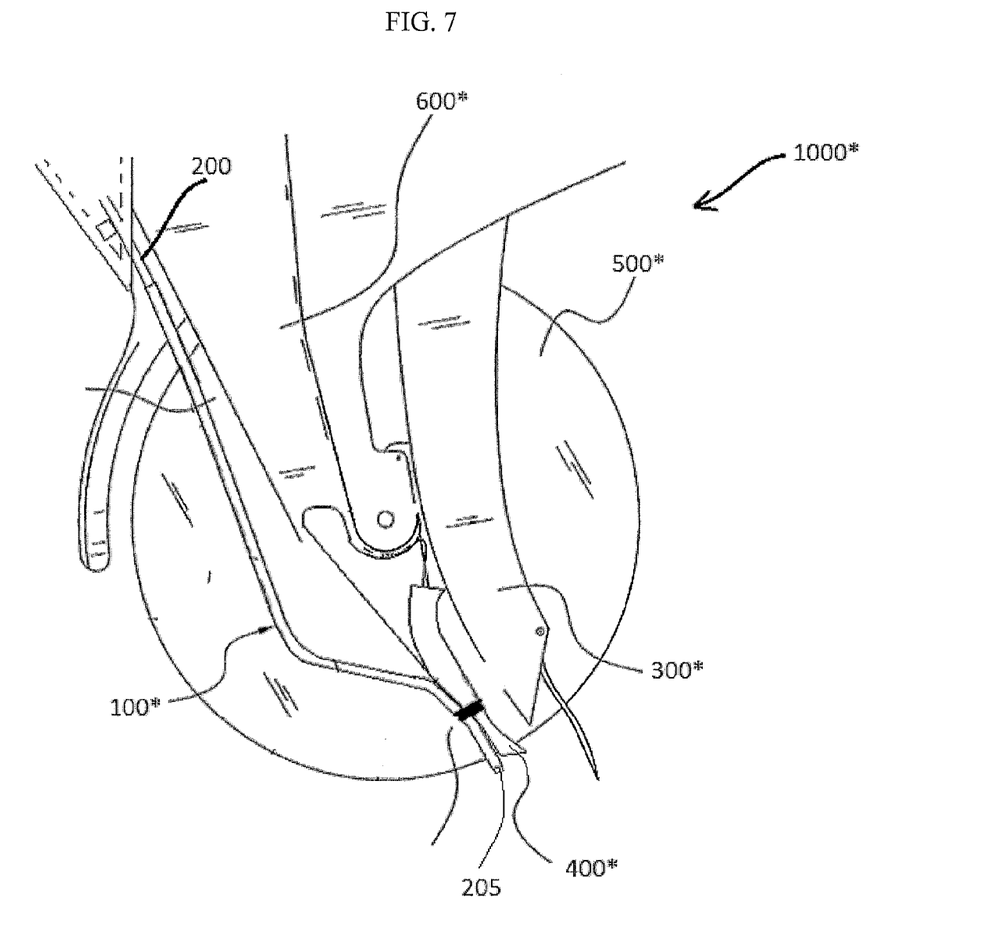
FIG. 7 is a view of another implement in accordance with example embodiments.

FIG. 7 illustrates the tube 100* attached to a planter implement 1000*. The planter implement 1000* may be similar to previously described planter implement 1000. In the specific example of FIG. 7, the planter implement 1000* is shown as being comprised of a seed tube 300*, a seed tube guard 400*, at least one disk 500*, and a shank 600*. In example embodiments, the tube 100* may be attached to planter implement 1000*. For example, the tube 100* may be attached to the seed tube guard 400* by a conventional method such as welding, however, the invention is not limited thereto. For example, the tube 100* may be attached to the guard 400* by a different method or device such as, but not limited to, ties, straps, clamps, and or clips. In this particular non-limiting example, the bends of the tube 100* are particularly well suited for following the contour of the seed tube guard 400*. In example embodiments, the hose 200 may be threaded through the tube 100* so the end 205 of the hose 200 protrudes through the tube 100* as shown in FIG. 7. Thus, as fertilizer flows through the tube 200 the fertilizer may flow near the seed tube 300* so that fertilizer may be placed in a furrow which may be created by the at least one disk 500*.

In example embodiments, the tube 200 is shown protruding through ends of the tubes 100 and 100*. This, however, is not intended to limit the invention as the end 205 of the tube may be flush with ends of the tubes 100 and 100* or may reside inside the tubes 100 and 100*.

Figure 8:
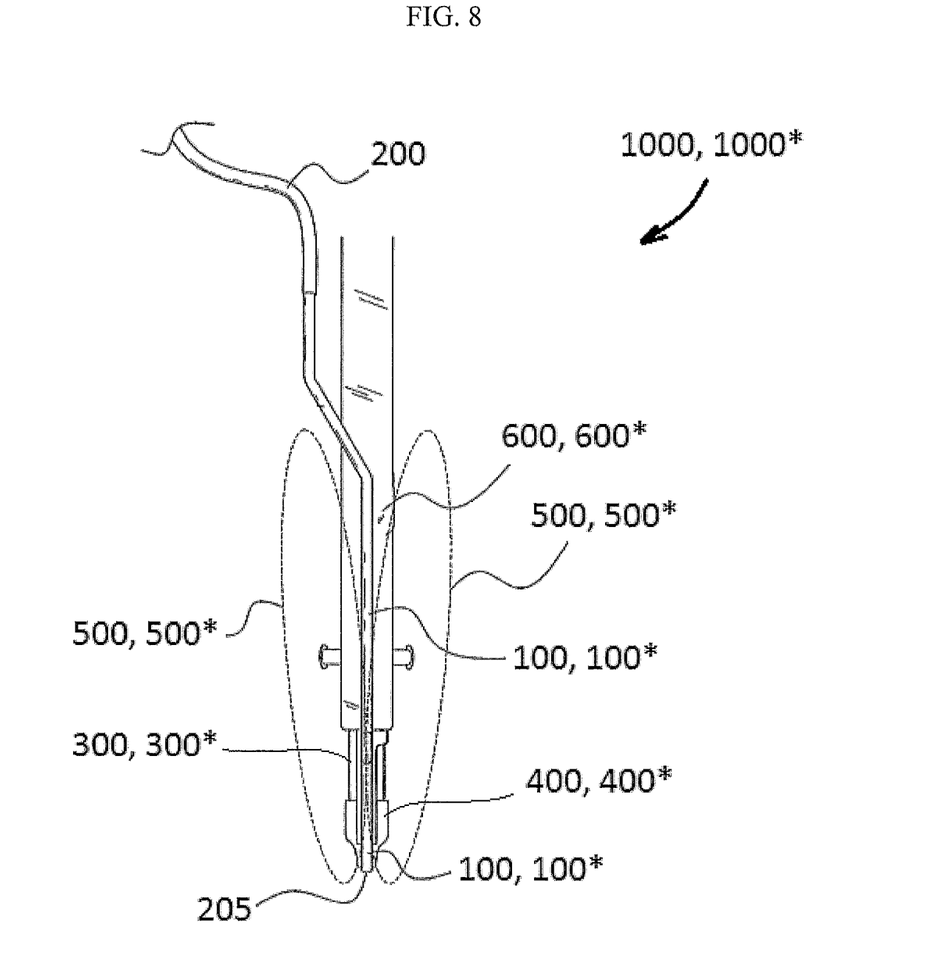
FIG. 8 if a back view of the implements in accordance with example embodiments.

FIG. 8 is a back view of the planter implements 1000 and 1000*. As shown in FIG. 8, the planter implements 1000 and 1000* may include a pair of disks 500, 500* arranged to the sides of the shanks 600, 600*. In example embodiments, the tubes 100, 100* may be substantially in line with their respective seed tubes 300, 300* as shown in FIG. 8 so that when fertilizer is deposited in a furrow created by the disks 500, 500* the seeds will fall in a spot where the fertilizer has been deposited.

In example embodiments, the planter implements 1000 and 1000* along with the tubes 100 and 100* and the hose 200 may form fertilizer application systems. For example, the planter implement 1000 with the tube 100 and the hose 200 may form a first example of a fertilizer application system and the planter implement 1000*, the tube 100*, and the hose 200 may form a second example of a fertilizer application system. In example embodiments the hose 200 of either system extends near a bottom of the planter implement 1000 and 1000* to deposit a liquid fertilizer in a furrow that may be created by the disks 500 and 500* of the respective planter implements 1000 and 1000*. In example embodiments the hose 200 may be a flexible hose which is partially enclosed by, and protected by, the tubes 100 and 100*. In some conventional systems hoses direct liquid fertilizer to tubes which are attached to planter implements. However, in these systems the tubes do not enclose the hoses. Further, connections between the tubes and the hoses are prone to breaking. Thus, in the conventional systems fertilizer may not flow through the conventional tubes and into the tubes in the event there is a break. However, in example embodiments, because the hose 200 extends through the tubes 100 and 100* (which act as sleeves), the shortcomings of the conventional art are avoided. As such, the fertilizer application systems of example embodiments provide for a more robust and reliable method of depositing liquid fertilizer in a furrow.

Figure 9A:
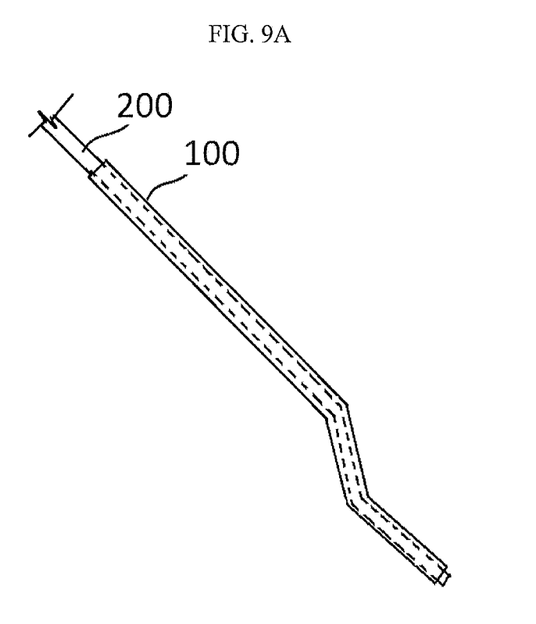
FIGS. 9A and 9B illustrate close up views of a fertilizer hose and tube in accordance with example embodiments and the prior art.
Figure 9B:
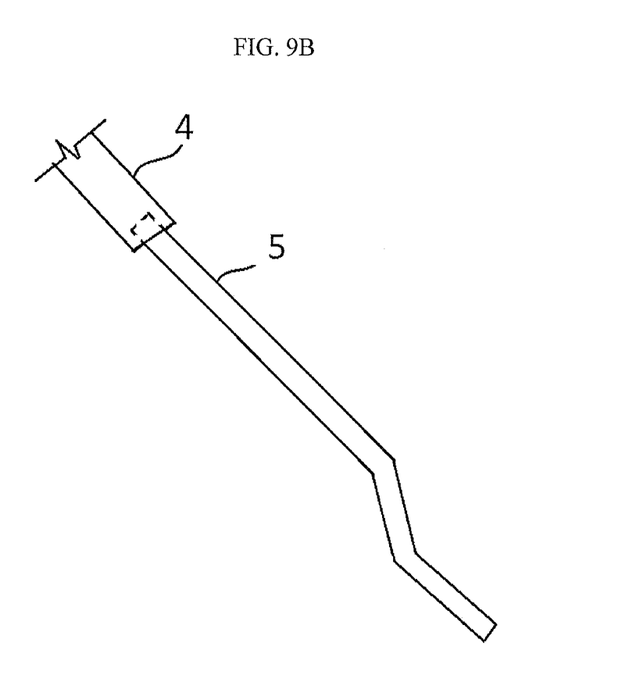

FIG. 9A illustrates a close up of the tube 100 and the fertilizer hose 200 in accordance with example embodiments. FIG. 9B illustrates a close up of the tube 5 and the fertilizer hose 4 of the conventional art. In FIG. 9A the fertilizer hose 200 is inserted into and extends through a substantial portion of the tube 100. For example, in FIG. 9A the fertilizer hose 200 is illustrated as traversing an entire length of the tube 100. It is understood, however, the fertilizer hose 200 is not required to traverse the entire length of the tube 100 but may instead simply traverse a portion, for example, a majority of the length of the tube 100. In contrast, the fertilizer hose 4 of the conventional art terminates near an end of the tube 5 and is not inserted into the tube 5. Rather, the hose 4 terminates near a distal end of the tube 5 where the fertilizer is not intended to exit. In the conventional art it is possible the hose 4 and tube 5 may become uncoupled which results in fertilizer being inappropriately placed. In example embodiments the tube 100 functions as a sleeve which supports a relatively long continuous hose 200 so that the end of the hose will deliver fertilizer to the correct place.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the claims.

What is claimed is:

1. A fertilizer application system comprising:
   a planter implement comprising a shank, a seed tube guard attached to the shank, and a seed tube behind the seed tube guard;
   a sleeve having at least one bend; and
   a flexible hose extending through at least a portion of the sleeve, wherein the flexible hose is configured to transport liquid fertilizer from a fertilizer tank to a furrow in a ground created by the planter implement, wherein the sleeve includes a first portion and a second portion and the first portion is arranged so the seed tube guard is between the first portion and the seed tube and the second portion is arranged so the shank is between the second portion and the seed tube.

2. The fertilizer application system of claim 1, wherein the sleeve extends below a bottom of the seed tube.

3. The fertilizer application system of claim 1, wherein the planter implement further includes a pair of disks and the sleeve is between the pair of disks.

4. The fertilizer application system of claim 3, wherein the sleeve is substantially in line with the seed tube.

5. The application system of claim 1, wherein the sleeve has
   a first bend about 4 7/16 inches from a first end of the sleeve and
   a second bend about 1 7/8 inches, the first bend forming a first angle and the second bend forming a second angle.

6. The application system 5, wherein the first angle is about 30 degrees and the second angle is about 29 degrees.

7. The application system of claim 6, wherein each of the first bend and the second bend have a radius of about 1 5/8 inches.

8. The application system of claim 1, wherein the sleeve has
   a first bend about at 6 3/4 inches from an end of the sleeve, a second bend about 2¾ inches from the first bend, and
a third bend about 3 1/16 inches from the second bend, the first bend forming a first angle, the second bend forming a second angle, and the third bend forming a third angle.

9. The application system 8, wherein the first angle is about 29 degrees, the second angle is about 16 degrees, and the third angle is about 16 degrees.

10. The application system of claim 9, wherein each of the first bend, the second bend, and the third bend have a radius of about 7/8 inches.

11. The application system of claim 1, wherein the sleeve has an inner diameter larger than an outer diameter of the hose.

12. The application system of claim 1, wherein the hose traverses an entire length of the sleeve.

13. The application system of claim 1, wherein the hose extends out of a first end of the sleeve.

14. The application system of claim 1, wherein the sleeve is comprised of stainless steel.

15. The application system of claim 1, wherein the first portion is welded to the seed tube guard.

16. The application system of claim 1, wherein the first portion and the second portion are inclined with respect to one another.

17. The application system of claim 1, wherein the sleeve is rigidly attached to the seed tube guard so that the seed tube guard and the sleeve act as substantially unitary member.

18. The application system of claim 16, wherein the first portion is substantially straight and extends along a front surface of the seed tube guard.

* * * * *